(12) United States Patent
Banks

(10) Patent No.: X9802
(45) Date of Patent: Jun. 30, 1836

(54) HIDES, UNHAIRING

(76) Inventor: James Banks

James Banks of Dixmont, Maine
Letters Patent

The schedule referred to in these Letters Patent, and making part of the same, containing a description in the words of the said James Banks himself, of his improvement in the process of unhairing of Hides for Tanning –

---

To all whom these presents shall come:

Be it known that I James Banks of Dixmont in the County of Penobscot and State of Maine have invented a new and useful improvement in the unhairing of hides for Tanning, and that the following is a full and exact description thereof: the hides are to be softened in the usual manner, they are then suspended in a light room or vat and subjected to the action of steam at a temperature not exceeding blood heat, this process is to be continued in warm weather about four days and in cold weather about seven days when the hairs can easily and readily be removed from the skin by the fleshing knife in the usual manner –

This method of unhairing is to be applied only to those skins designed to be manufactured into Sole Leather –

What I claim as my own invention and not previously known in the above described process is the application of Steam –

Exd [illegible]

Witnesses
Charles M. Adams
Geo. Rigby

James Banks